(12) United States Patent
Takagi et al.

(10) Patent No.: US 7,088,558 B2
(45) Date of Patent: Aug. 8, 2006

(54) DISK DRIVE HEAD SUSPENSION WITH FLEXURE AND LOAD BEAM SUPPORTED ON OPPOSITE SIDES OF CARRIAGE ARM

(75) Inventors: Yasuji Takagi, Yokohama (JP); Hidenori Ogawa, Yokohama (JP); Ichiro Takadera, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 129 days.

(21) Appl. No.: 10/391,377

(22) Filed: Mar. 18, 2003

(65) Prior Publication Data

US 2003/0179501 A1  Sep. 25, 2003

(30) Foreign Application Priority Data

Mar. 22, 2002  (JP) .............................. 2002-082143

(51) Int. Cl.
  *G11B 5/48* (2006.01)
  *G11B 5/55* (2006.01)
  *G11B 21/08* (2006.01)
  *G11B 21/16* (2006.01)

(52) U.S. Cl. .............................. 360/265.9; 360/245.2; 360/245.7; 360/266

(58) Field of Classification Search ................ 360/245, 360/245.2, 245.7, 245.9, 265.9, 266, 266.3, 360/245.8
See application file for complete search history.

(56) References Cited

U.S. PATENT DOCUMENTS

| 4,167,765 | A |   | 9/1979 | Watrous |
| 5,870,258 | A | * | 2/1999 | Khan et al. ............... 360/245.9 |
| 6,057,986 | A | * | 5/2000 | Takasugi .................. 360/245.9 |
| 6,072,664 | A | * | 6/2000 | Aoyagi et al. .............. 360/245 |
| 6,382,499 | B1 |   | 5/2002 | Satoh et al. |
| 6,456,463 | B1 | * | 9/2002 | Van Sloun ............... 360/266.1 |
| 6,518,521 | B1 | * | 2/2003 | Marek et al. ............ 360/245.8 |
| 6,872,896 | B1 | * | 3/2005 | Young et al. ............... 200/283 |

FOREIGN PATENT DOCUMENTS

| JP | 2-65270  | 5/1990 |
| JP | 3-080481 | 4/1991 |

* cited by examiner

*Primary Examiner*—Craig A. Renner
(74) *Attorney, Agent, or Firm*—Jordan and Hamburg, LLP

(57) ABSTRACT

To be capable of precisely positioning a head on a track of a high-density disk rotated at high speed in the disk drive, a head suspension has a plate (3) to be attached to a carriage of the disk drive and turned around a spindle, a load beam (5) having a rigid part (11) and a resilient part (17) and supported by the plate, a front end of the rigid part applying load on a head (13) that writes and reads information to and from the disk, a flexure (7) supporting the head, and an extension (15) having a length (L2) and extending from the plate along the rigid part of the load beam toward the head. The flexure is supported at least by the extension of the plate, and at least supporting the flexure.

13 Claims, 10 Drawing Sheets ically positioned on the disk. An example of the cross-bar pro-file of the flexure on a

DISK DRIVE HEAD SUSPENSION WITH FLEXURE AND LOAD BEAM SUPPORTED ON OPPOSITE SIDES OF CARRIAGE ARM

BACKGROUND OF THE INVENTION

1. Field of the Invention

The present invention relates to a head suspension for a disk drive incorporated in an information processing apparatus such as a personal computer.

2. Description of the Related Art

A hard disk drive (HDD) records and reproduces information to and from rotating magnetic or magneto-optical disks. The HDD has a carriage driven by a positioning motor, to turn around a spindle.

An example of the carriage is disclosed in U.S. Pat. No. 4,167,765. The carriage of this disclosure includes carriage arms, a head suspension attached to a front end of each carriage arm, a head attached to the head suspension, and a slider attached to the head. When disks in a disk drive where the carriage is arranged are rotated at high speed, the sliders slightly float from the disks, and air bearings are formed between the disks and the sliders.

FIG. 27 is a sectional view showing a part of a disk drive with head suspensions according to a prior art. The disk drive 101 has a carriage 105. The carriage 105 is driven by a positioning motor 107 such as a voice coil motor, to turn around a spindle 103. The carriage 105 has a plurality of (four in FIG. 27) carriage arms 109 each having at least one head suspension 111 with a head 113 arranged at a front end thereof.

The carriage 105 is turned around the spindle 103, to move each head 113 onto a target track on a disk 115. The head 113 has a slider 117 facing the track on the disk 115, a transducer (not shown) held by the slider 117, and the like.

When the disks 115 are rotated at high speed, air enters between the disks 115 and the sliders 117 and forms air bearings at there to slightly float the sliders 117 from the disks 115.

FIG. 28 shows an example of the head suspension 111. The head suspension 111 includes a load beam 119 made of a precision thin plate spring, a flexure 121 made of a very thin plate spring fixed to the load beam 119 by, for example, laser welding, and a base plate 123 fixed to a base part of the load beam 119 by, for example, laser welding. The base plate 123 is fixed to a head suspension fitting face of the carriage arm 109.

Recent hard disk drives employ high-density disks and drive the disks at high speed. Such high-density disks involve narrow tracks. Due to such narrow tracks and vibration such as butterfly-mode vibration on the head suspension 111 caused by, for example, air disturbance even at high frequencies, it is difficult to correctly maintain the head 113 on a track of a disk.

Many studies and improvements have been made for the carriage arms and head suspensions in connection with controlling amplitudes for various resonance modes, increasing resonance frequencies, and suppressing air disturbance.

According to the prior art of FIG. 28, the flexure 121 is fixed to the load beam 119, and therefore, the load beam 119 is directly affected by the weight of the flexure 121 including the slider 117, to decrease a resonance frequency. In addition, the movement and vibration of the flexure 121 due to the movement of the slider 117 are directly transmitted to the load beam 119, to deteriorate the vibration characteristics of the load beam 119.

These circumstances make it difficult to correctly control amplitudes and precisely position the head 113 on a track on a high-density, high-speed disk.

SUMMARY OF THE INVENTION

An object of the present invention is to provide a head suspension for a disk drive, capable of correctly positioning a head on a track on a high-density, high-speed disk.

A first aspect of the present invention provides a head suspension for a disk drive, having a plate to be attached to a carriage of the disk drive and turned around a spindle, a load beam having a rigid part and a resilient part and supported by the plate, a front end of the rigid part applying load on a head that writes and reads information to and from a disk, a flexure supporting the head, and an extension extending from the plate along the rigid part of the load beam toward the head. The flexure is supported at least by the extension of the plate.

For the head suspension of the first aspect, a second aspect of the present invention defines, on the plate, a first face that faces the disk and a second face that does not face the disk. The first face supports the flexure, and the second face supports the load beam.

For the head suspension of the first aspect, a third aspect of the present invention supports the load beam and flexure on a first face of the plate that faces the disk.

For the head suspension of any one of the first to third aspects, a fourth aspect of the present invention arranges a load beam limiter between the plate and the load beam, to restrict displacement of the load beam.

For the head suspension of the fourth aspect, a fifth aspect of the present invention forms the load beam limiter from a limiter arm extending from the extension of the plate toward the head and an attachment arranged on at least one of the limiter arm and load beam, to allow the limiter arm and load beam to engage with each other.

For the head suspension of any one of the first to third aspects, a sixth aspect of the present invention arranges a flexure limiter between the plate and the flexure, to restrict displacement of the flexure.

For the head suspension of the sixth aspect, a seventh aspect of the present invention forms the flexure limiter from a limiter arm extending from the extension of the plate toward the head and an attachment arranged on at least one of the limiter arm and flexure, to allow the limiter arm and flexure to engage with each other.

The first aspect turns the plate around the spindle, to position the head on a target track on the disk and writes and reads information to and from the disk through the head. The load beam has the rigid part and resilient part and is supported by the plate. A front end of the rigid part applies load on the head.

The plate has the extension extending along the rigid part of the load beam toward the head. The flexure is supported at least by the extension of the plate, and therefore, the weight of the flexure including a slider, which is attached to the head, does not directly affect the load beam. Namely, the movement and vibration of the flexure due to the movement of the head are not directly transmitted to the load beam. This secures the vibration characteristics of the load beam.

The first aspect, therefore, can precisely position the head on a track of even a high-density, high-speed disk.

In addition to the effects of the first aspect, the second aspect supports the flexure on the first face of the plate and the load beam on the second face of the plate. Namely, the second aspect properly supports the load beam and flexure with the plate.

In addition to the effects of the first aspect, the third aspect supports the load beam and flexure on the first face of the plate that faces the disk. This configuration allows the plate to support the load beam and flexure on each face of the plate to cope with a plurality of disks.

In addition to the effects of the first to third aspects, the fourth aspect arranges the load beam limiter between the plate and the load beam, to restrict displacement of the load beam. The load beam limiter prevents the head from excessively rising, so that the head can precisely write and read information to and from the disk.

In addition to the effects of the fourth aspect, the fifth aspect forms the load beam limiter from the limiter arm extending from the extension of the plate toward the head and the attachment arranged on at least one of the limiter arm and load beam, to allow the limiter arm and load beam to engage with each other. The limiter arm and attachment surely prevent the head from excessively rising.

In addition to the effects of the first to third aspects, the sixth aspect arranges the flexure limiter between the plate and the flexure, to restrict displacement of the flexure. The flexure limiter prevents the head from excessively rising, so that the head can precisely write and read information to and from the disk.

In addition to the effects of the sixth aspect, the seventh aspect forms the flexure limiter from the limiter arm extending from the extension of the plate toward the head and the attachment arranged on at least one of the limiter arm and flexure, to allow the limiter arm and flexure to engage with each other. The limiter arm and attachment surely prevent the head from excessively rising.

DETAILED DESCRIPTION OF EMBODIMENTS

First Embodiment

Figure 1:
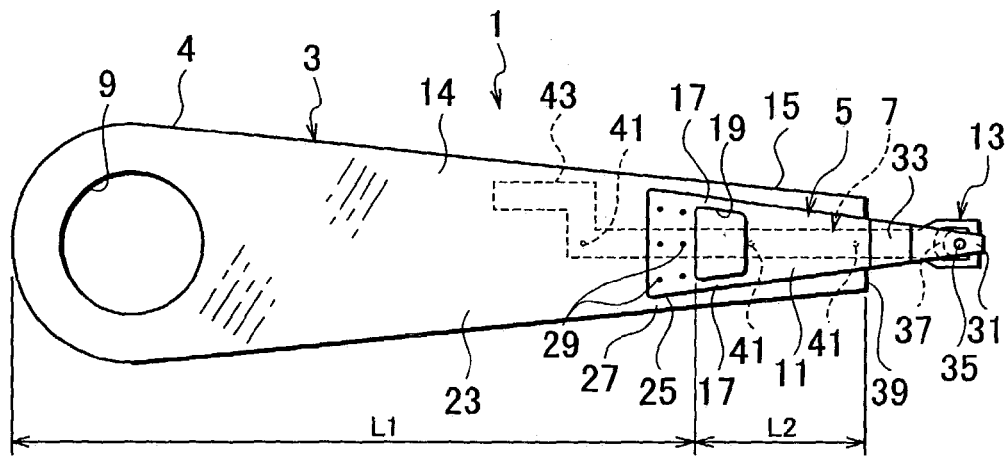
FIG. 1 is a plan view showing a head suspension for a disk drive according to a first embodiment of the present invention.
Figure 2:
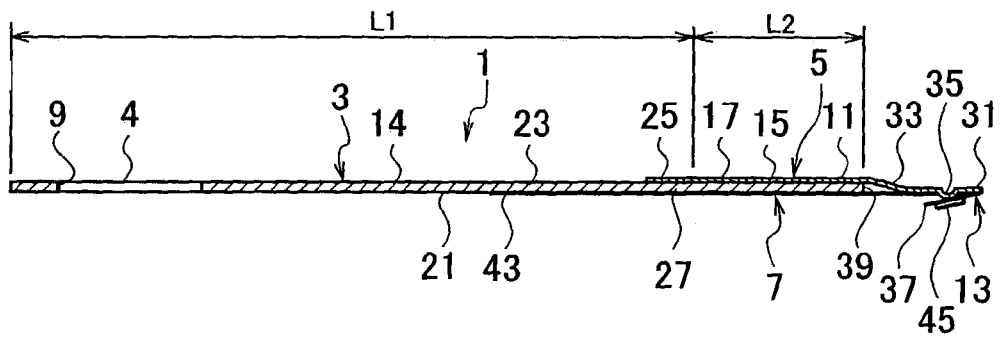
FIG. 2 is a sectional view showing the head suspension of FIG. 1.
Figure 3:
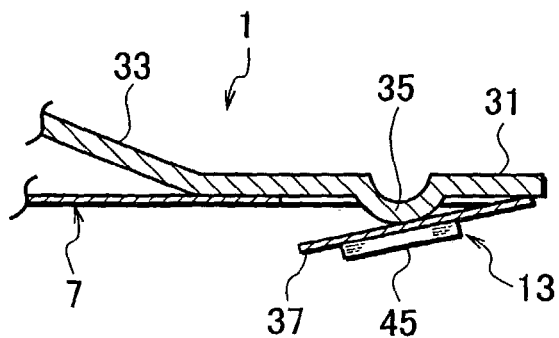
FIG. 3 is an enlarged sectional view showing a head area of the head suspension of FIG. 1.

FIGS. 1 to 3 show a head suspension 1 for a disk drive according to the first embodiment of the present invention, in which FIG. 1 is a plan view showing the head suspension 1, FIG. 2 is a sectional view showing the same, and FIG. 3 is an enlarged sectional view showing a head area of the same.

The head suspension 1 has an arm 3, a load beam 5, and a flexure 7.

The arm 3 is a plate to be fixed to a carriage of the disk drive and to be turned around a spindle. The arm 3 singly serves as a carriage arm as well as a base plate. The arm 3 extends from the carriage toward the load beam 5. The arm 3 is made of, for example, stainless steel and is relatively thick, for example, about 0.3 mm thick. In the plan view, the width of the arm 3 gradually becomes narrower toward the load beam 5. The arm 3 has a base 4 having a hole 9 through which the arm 3 is fixed to the carriage, so that the arm 3 is driven around the spindle by a positioning motor such as a voice coil motor. The arm 3 includes an arm body 14 having a length of L1 and an extension 15 having a length of L2. The extension 15 extends along a rigid part 11 of the load beam 5 toward a head 13. The arm body 14 and extension 15 are integral with each other.

The load beam 5 consists of the rigid part 11 and a resilient part 17 and is supported by the arm 3 so that a front end of the rigid part 11 may apply load on the head 13 that writes and reads information to and from a disk. The load beam 5 is made of, for example, stainless steel and has a thickness of, for example, about 0.1 mm.

In the load beam 5, the rigid part 11 and resilient part 17 are integral with each other. The resilient part 17 is formed by making an opening 19 through the load beam 5. The resilient part 17 may be made of a separate spring material independently of the rigid part 11. In this case, the separate spring material may be a thin resilient rolled stainless steel having a thickness of, for example, about 0.04 mm. The separate spring material may have a precise spring constant lower than that of the rigid part 11.

The arm 3 has a first face 21 that faces the disk and a second face 23 that does not face the disk. The second face 23 supports the load beam 5. More precisely, a base end 25 of the load beam 5 is fixed to the second face 23 along a front end 27 of the arm body 14 at, for example, six locations by laser welding 29 or by bonding.

The load beam 5 has a front end 31 that protrudes from the extension 15 of the arm 3. The front end 31 has a bend 33 to bias the front end 31 toward the first face 21 of the arm 3 by about the thickness of the arm 3. The position of the front end 31 relative to the first face 21 is optional and can be set according to requirements. The front end 31 has a dimple 35 that contacts a tongue 37 of the flexure 7.

The flexure 7 is supported on the first face 21 of the arm 3 at least on the extension 15. The flexure 7 consists of a metal base made of, for example, a resilient thin rolled stainless steel, an insulating layer formed on the metal base, and a conductor formed on the insulating layer. According to the first embodiment, the flexure 7 is extended along and supported by the extension 15 and body 14 of the arm 3.

The flexure 7 is fixed to the first face 21 of the arm 3 by laser welding 41 or by bonding at three locations including a location adjacent to a front edge 39 of the extension 15, a location on the extension 15 close to the arm body 14, and a location on the arm body 14. In FIG. 1, the weld locations 41 are indicated with white circles.

As mentioned above, the flexure 7 is welded at the front edge 39 of the extension 15, so that head 13 of the flexure 7 is surely supported by the extension 15. This arrangement prevents the flexure 7 from playing in the vicinity of the head 13.

An end of the conductor of the flexure 7 is connected to a terminal of the head 13, and the other end of the conductor is connected to a terminal installation part 43 of the flexure to be installed a terminal(s) thereon arranged on the arm body 14. The head 13 has a slider 45.

Figure 27:
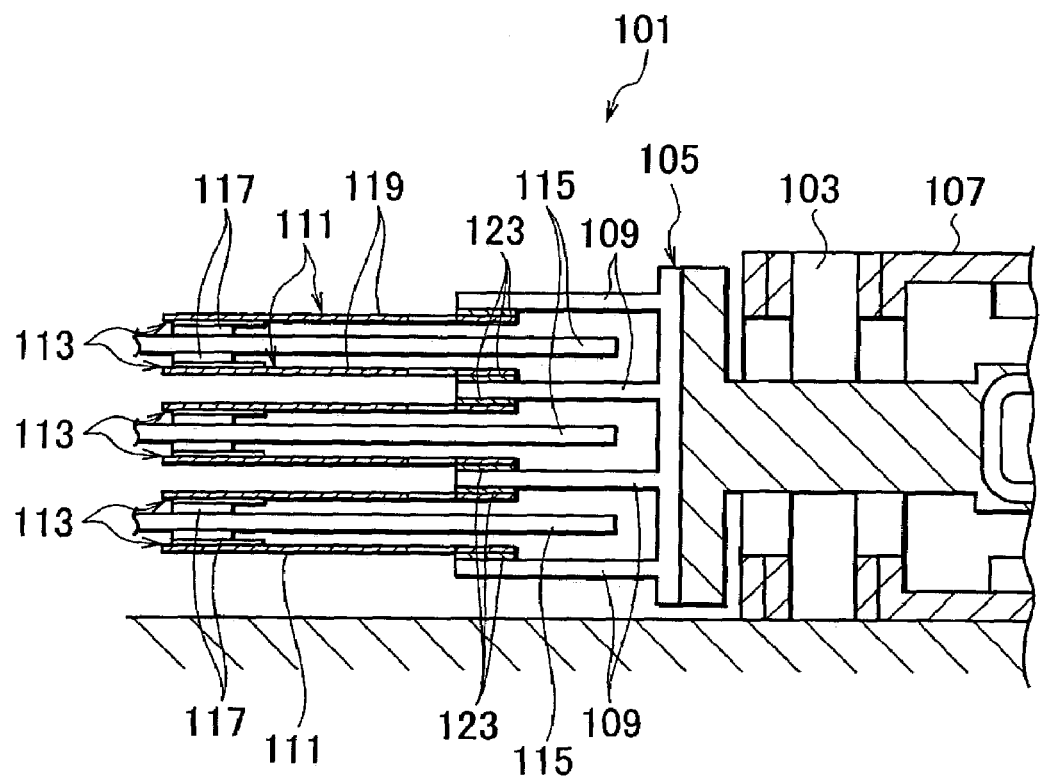
FIG. 27 is a sectional view partly showing a disk drive according to a prior art.
Figure 28:
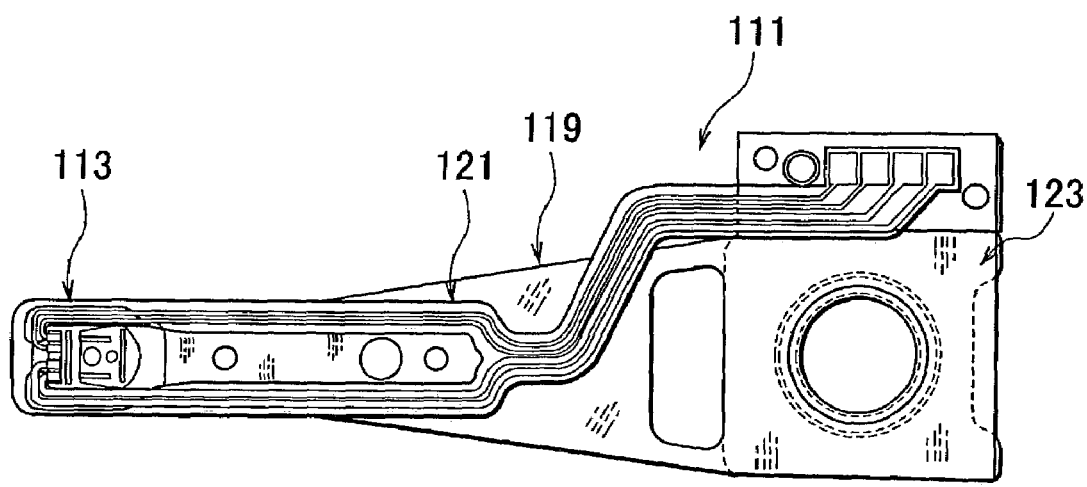
FIG. 28 is a bottom view showing a head suspension for a disk drive according to a prior art.

The arm 3 of the head suspension 1 is fixed to the carriage through the hole 9, so that the head suspension 1 may turn around the spindle of the positioning motor such as a voice coil motor. Unlike the prior art of FIG. 27 in which two head suspensions are fixed to a carriage arm between disks, the arm 3 of the head suspension 1 serves as a single carriage arm.

Generally, a disk drive involves a plurality of disks to increase an information storage capacity. There is a high-density disk that singly satisfies a storage capacity requirement. The head suspension 1 according to the first embodiment is appropriate for such a large-capacity disk that singly satisfies a storage capacity requirement. It is possible to employ a plurality of head suspensions 1 of the first embodiment for a plurality of disks if there is a sufficient space between the disks.

According to the first embodiment, the slider 45 slightly floats from a disk when the disk is rotated at high speed, and an air bearing is formed between the disk and the slider 45.

As a result, a small gap is formed between the extension 15 of the arm 3 and the rigid part 11 of the load beam 5. Then, the resilient part 17 of the load beam 5 functions to make the front end 31 of the load beam 5 apply load on the head 13.

Under this state, the flexure 7 is supported at least by the extension 15 of the arm 3 separately from the load beam 5, and therefore, the load beam 5 never directly receives the weight of the flexure 7 including the slider 45. Namely, the movement and vibration of the flexure 7 due to the movement of the slider 45 are not directly transmitted to the load beam 5. As a result, the vibration characteristics such as a resonance frequency of the load beam 5 will not be deteriorated by the weight of the flexure 7 including the slider 45. Also, the vibration characteristics of the load beam 5 will not be affected by the movement and vibration of the flexure 7. The head suspension 1 of the first embodiment, therefore, can precisely position the head 13 on a track of a high-density, high-speed disk.

Arranging the load beam 5 on the second face 23 of the arm 3 and the flexure 7 on the first face 21 thereof is advantageous in easily installing the load beam 5 and flexure 7 on the single arm 3.

If the disk drive receives a shock, the head 13 will be displaced toward the disk. At this time, the rigid part 11 of the load beam 5 gets in contact with the extension 15 of the arm 3, to prevent the head 13 from excessively being displaced toward the disk, thereby preventing the head 13 from hitting and damaging the disk.

According to the first embodiment, an air bearing is formed between the slider 45 and the disk, to form a gap between the rigid part 11 of the load beam 5 and the extension 15 of the arm 3. It is possible to provide a predetermined gap between the rigid part 11 and the extension 15 from the beginning.

Second Embodiment

Figure 4:
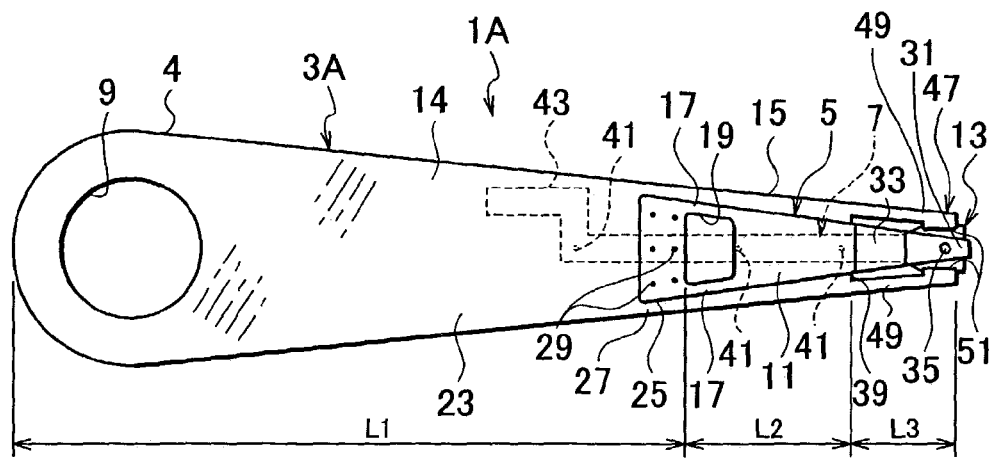
FIG. 4 is a plan view showing a head suspension for a disk drive according to a second embodiment of the present invention.
Figure 5:
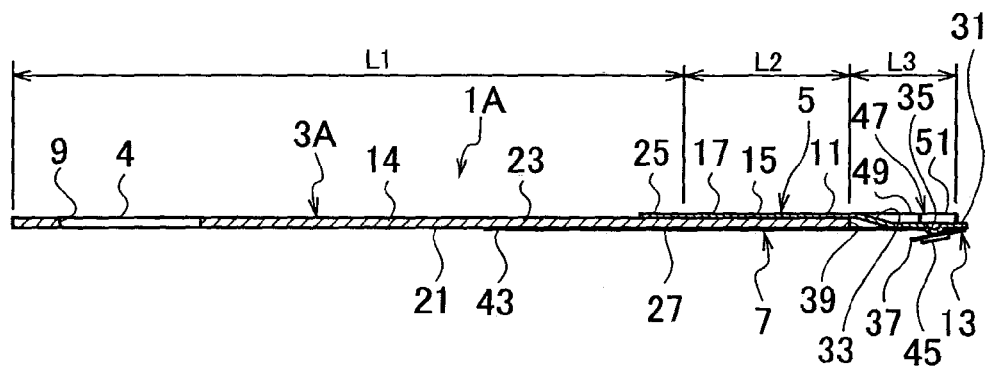
FIG. 5 is a sectional view showing the head suspension of FIG. 4.
Figure 6:
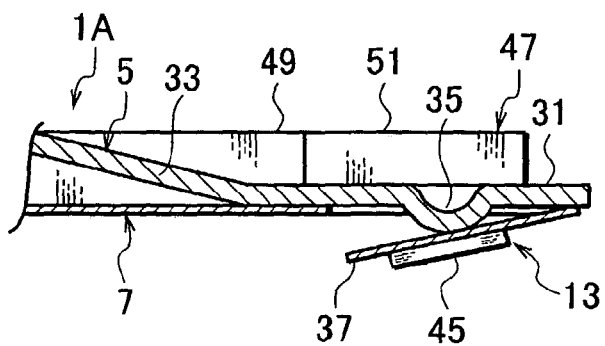
FIG. 6 is an enlarged sectional view showing a head area of the head suspension of FIG. 4.

FIGS. 4 to 6 show a head suspension 1A for a disk drive according to the second embodiment of the present invention, in which FIG. 4 is a plan view showing the head suspension 1A, FIG. 5 is a sectional view showing the same, and FIG. 6 is an enlarged sectional view showing a head area of the same. The head suspension 1A of the second embodiment is basically the same as that of the first embodiment, and therefore, like parts are represented with like reference marks.

The head suspension 1A has a flexure limiter 47 between a plate arm 3A and a flexure 7, to suppress displacement of the flexure 7. The flexure limiter 47 consists of limiter arms 49 and attachments 51.

Each limiter arm 49 has a length of L3, and the two limiter arms 49 are extended from a front edge 39 of an extension 15 of the arm 3A toward a head 13. The attachment 51 is arranged at a front end of each limiter arm 49. The attachments 51 protrude toward each other over the head 13 of the flexure 7.

The attachments 51 have a predetermined gap relative to the head 13 of the flexure 7 in an initial state. The gap is set such that, when a disk in the disk drive is rotated at high speed, a slider 45 arranged at the head 13 floats to form an air bearing between the slider 45 and the disk.

The second embodiment provides substantially the same effects as the first embodiment.

In addition, according to the second embodiment, the head 13 gets in touch with the attachments 51 when the head 13 with the slider 45 rises. At this time, the attachments 51 restrict the rise of the head 13, so that the head 13 may precisely write and read information to and from the disk.

If the disk drive receives a shock, the head 13 of the flexure 7 will greatly be displaced. At this time, the attachments 51 get in contact with the head 13 and restrict the displacement of the head 13. This surely prevents the head 13 from hitting and damaging the disk.

Restricting displacement of the head 13 by the attachments 51 and restricting displacement of a rigid part 11 of a load beam 5 by the extension 15 of the arm 3A result in surely suppressing displacement of the head 13. The second embodiment, therefore, surely prevents the head 13 from hitting and damaging the disk when the disk drive receives a shock.

The attachments 51 may be arranged at least on the limiter arms 49 or on the flexure 7, so that the limiter arms 49 and flexure 7 may engage with each other. If the attachments 51 are arranged on the flexure 7, they engage with the limiter arms 49.

Third Embodiment

Figure 7:
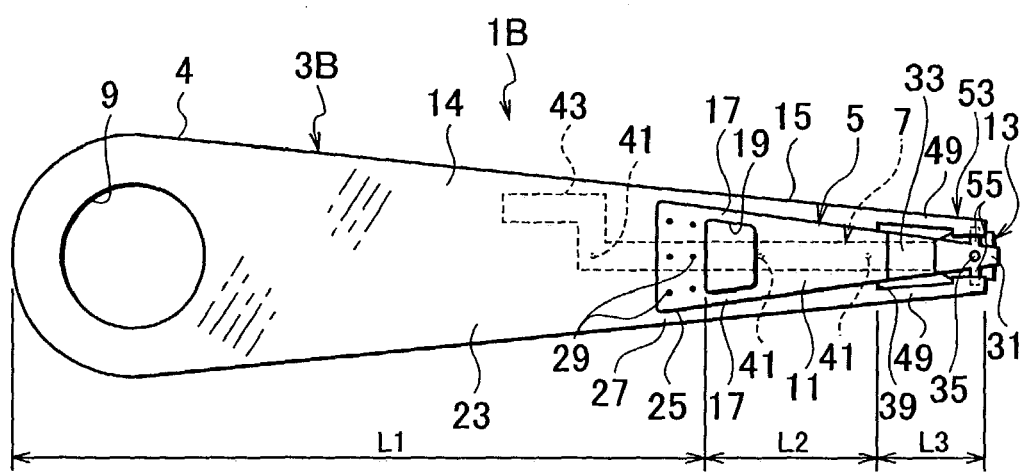
FIG. 7 is a plan view showing a head suspension for a disk drive according to a third embodiment of the present invention.
Figure 8:
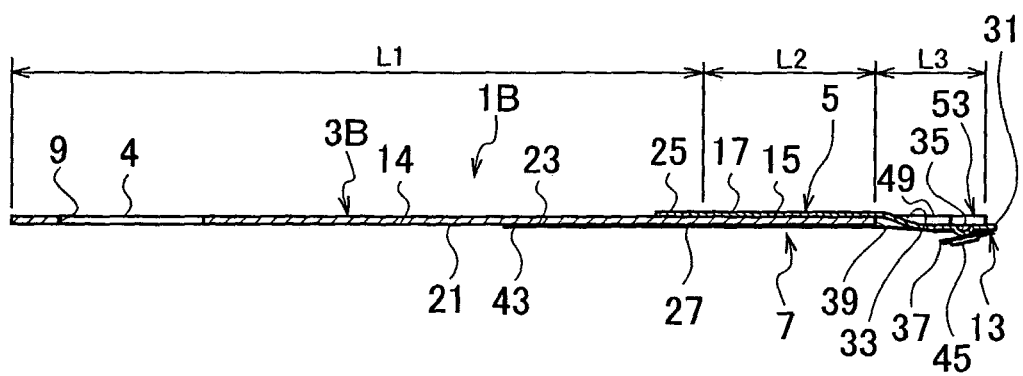
FIG. 8 is a sectional view showing the head suspension of FIG. 7.
Figure 9:
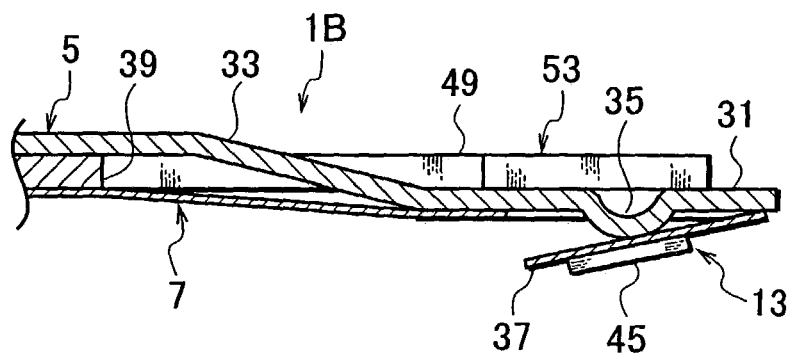
FIG. 9 is an enlarged sectional view showing a head area of the head suspension of FIG. 7.

FIGS. 7 to 9 show a head suspension 1B for a disk drive according to the third embodiment, in which FIG. 7 is a plan view showing the head suspension 1B, FIG. 8 is a sectional view showing the same, and FIG. 9 is an enlarged sectional view showing a head area of the same. The head suspension 1B of the second embodiment has substantially the same structure as that of the first embodiment, and therefore, like parts are represented with like reference marks.

The head suspension 1B has a load beam limiter 53 between a plate arm 3B and a load beam 5, to restrict displacement of the load beam 5. The load beam limiter 53 consists of limiter arms 49 and attachments 55.

The attachments 55 are protrusions protruding from each side of a front end 31 of the load beam 5 in the vicinity of a dimple 35. Each attachment 55 faces a corresponding limiter arm 49 at the level of a first face 21 of the arm 3B. Between the corresponding attachment 55 and limiter arm 49, there is a predetermined gap in an initial state. The gap allows a slider 45 of a head 13 to float from a disk to form an air bearing between the slider 45 and the disk when the disk is rotated at high speed.

The third embodiment provides substantially the same effects as the first embodiment.

In addition, according to the third embodiment, the attachments 55 get in contact with the limiter arms 49 when the head 13 rises due to the floating of the slider 45. The attachments 55 thereby restrict the rise of the head 13, so that the head 13 may precisely write and read information to and from the disk.

If the disk drive receives a shock, the attachments 55 get in contact with the limiter arms 49, to prevent the head 13 from excessively being displaced, thereby surely preventing the head 13 from hitting and damaging the disk.

The attachments 55 restrict displacement of the head 13 and an extension 15 of the arm 3B restricts displacement of the load beam 5. These actions surely suppress displacement of the head 13 when the disk drive receives a shock and prevent the head 13 from hitting and damaging the disk.

The attachments 55 may be arranged on the limiter arms 49 or on the load beam 5, to engage the limiter arms 49 and load beam 5 with each other. As mentioned below, the attachments 55 may be arranged on the limiter arms 49, so that the attachments 55 may engage with the front end 31 of the load beam 5.

Fourth Embodiment

Figure 10:
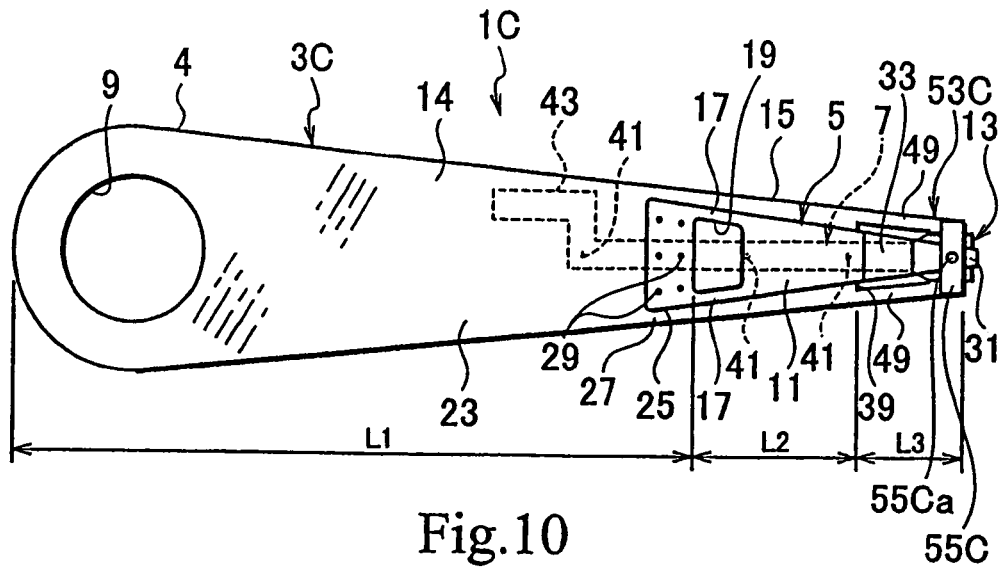
FIG. 10 is a plan view showing a head suspension for a disk drive according to a fourth embodiment of the present invention.
Figure 11:
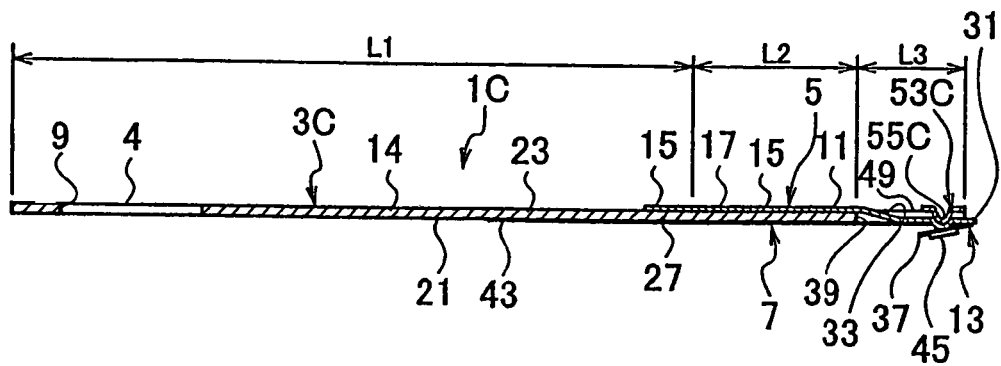
FIG. 11 is a sectional view showing the head suspension of FIG. 10.
Figure 12:
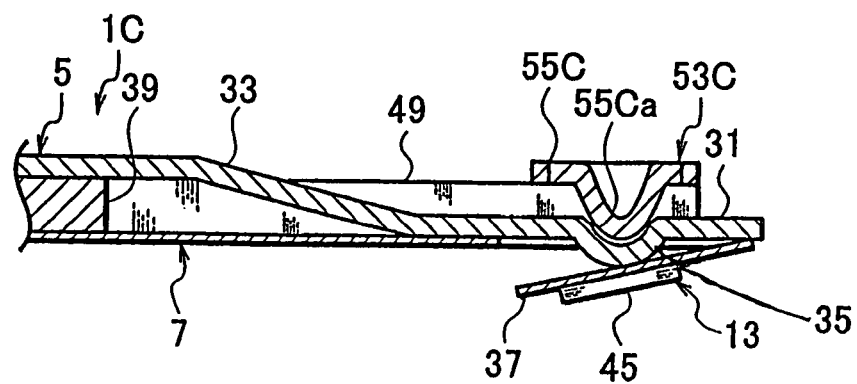
FIG. 12 is an enlarged sectional view showing a head area of the head suspension of FIG. 10.

FIGS. 10 to 12 show a head suspension 1C for a disk drive according to the fourth embodiment of the present invention, in which FIG. 10 is a plan view showing the head suspension 1C, FIG. 11 is a sectional view showing the same, and FIG. 12 is an enlarged sectional view showing a head area of the same. The head suspension 1C of the fourth embodiment is basically the same as that of the third embodiment, and therefore, like parts are represented with like reference marks.

The head suspension 1C employs a load beam limiter 53C instead of the load beam limiter 53 of the third embodiment. The load beam limiter 53C consists of limiter arms 49 and an attachment 55C connecting front ends of the limiter arms 49 to each other. The attachment 55C is fixed to the limiter arms 49 by, for example, laser welding or by bonding. The attachment 55C has a protrusion 55Ca that faces a front end 31 of a load beam 5. Between the protrusion 55Ca and the front end 31 of the load beam 5, a predetermined gap is formed in an initial state to allow an air bearing to be formed between a slider 45 and a disk, like the third embodiment.

When a head 13 of a flexure 7 rises due to the movement of the slider 45, the front end 31 of the load beam 5 engages with the protrusion 55Ca of the attachment 55C. The attachment 55C restricts the rise of the head 13, so that the head 13 can precisely write and read information to and from the disk. The fourth embodiment, therefore, provides the same effects as the third embodiment.

In addition, according to the fourth embodiment, the front ends of the limiter arms 49 are connected to each other through the attachment 55C, to improve the rigidity of the limiter arms 49. When the front end 31 of the load beam 5 gets in contact with the protrusion 55Ca of the attachment 55C, the attachment 55 surely supports the front end 31 of the load beam 5.

Fifth Embodiment

Figure 13:
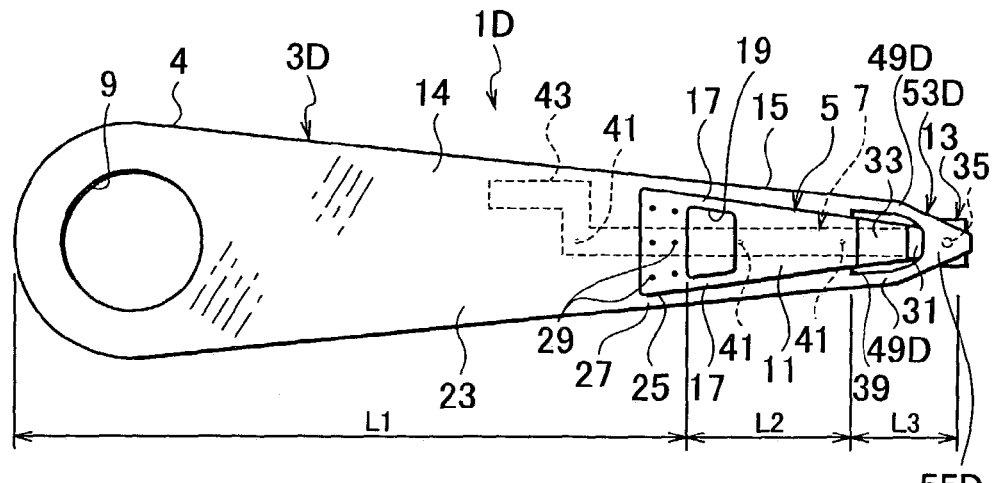
FIG. 13 is a plan view showing a head suspension for a disk drive according to a fifth embodiment of the present invention.
Figure 14:
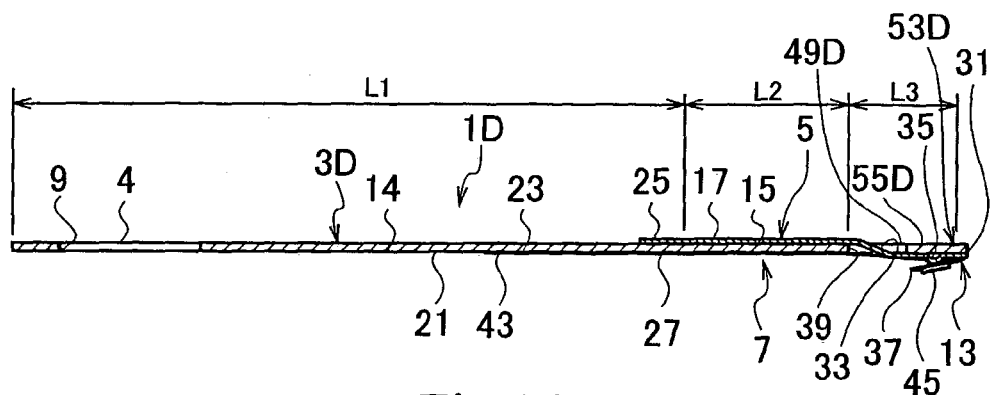
FIG. 14 is a sectional view showing the head suspension of FIG. 13.
Figure 15:
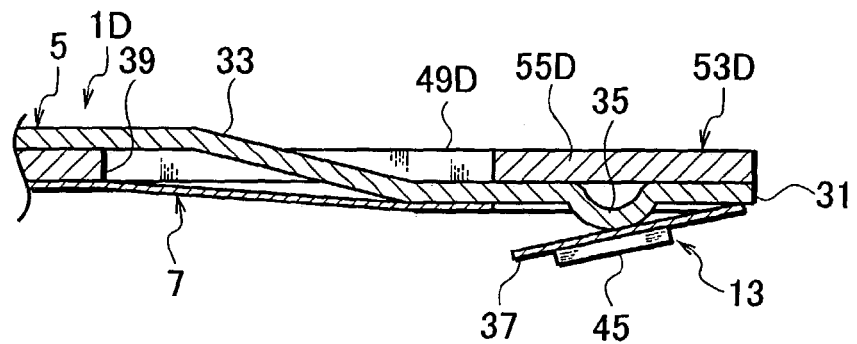
FIG. 15 is an enlarged sectional view showing a head area of the head suspension of FIG. 13.

FIGS. 13 to 15 show a head suspension 1D for a disk drive according to the fifth embodiment of the present invention, in which FIG. 13 is a plan view showing the head suspension 1D, FIG. 14 is a sectional view showing the same, and FIG. 15 is an enlarged sectional view showing a head area of the same. The head suspension 1D of the fifth embodiment is basically the same as that of the fourth embodiment, and therefore, like parts are represented with like reference marks.

The head suspension 1D employs a load beam limiter 53D instead of the load beam limiter 53C of the fourth embodiment. The load beam limiter 53D consists of limiter arms 49D and an attachment 55D that are integrated into one body. The fifth embodiment provides substantially the same effects as the fourth embodiment.

In addition, according to the fifth embodiment, the attachment 55D is integral with an arm 3D, and therefore, is easy to manufacture.

Sixth Embodiment

Figure 16:
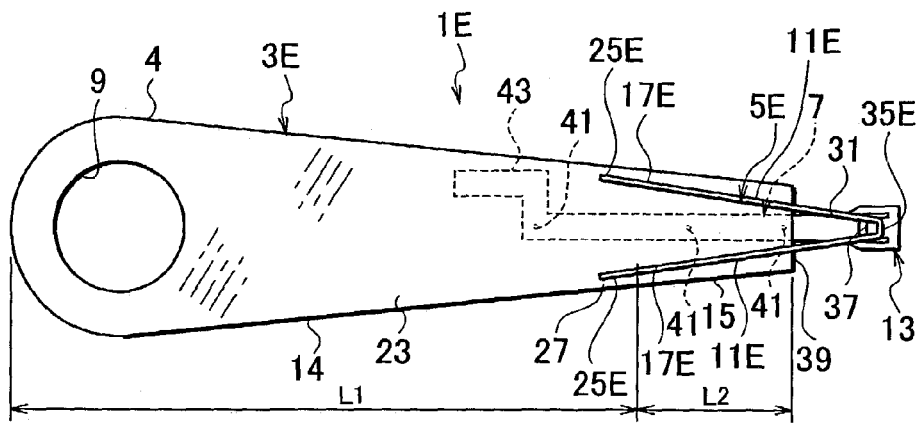
FIG. 16 is a plan view showing a head suspension for a disk drive according to a sixth embodiment of the present invention.
Figure 17:
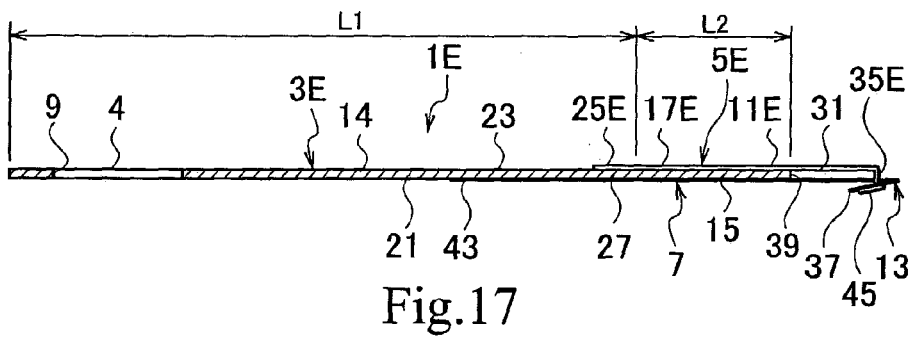
FIG. 17 is a sectional view showing the head suspension of FIG. 16.
Figure 18:
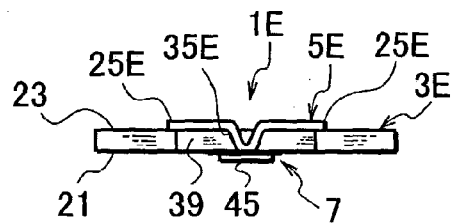
FIG. 18 is a front view showing a head area of the head suspension of FIG. 16.
Figure 19:
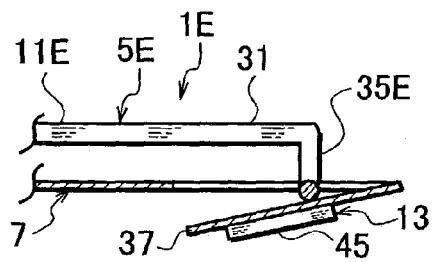
FIG. 19 is an enlarged sectional view showing the head area of the head suspension of FIG. 16.

FIGS. 16 to 19 show a head suspension 1E for a disk drive according to the sixth embodiment of the present invention, in which FIG. 16 is a plan view showing the head suspension 1E, FIG. 17 is a sectional view showing the same, FIG. 18 is a front view showing a head area of the same, and FIG. 19 is an enlarged sectional view showing the head area. The head suspension 1E of the sixth embodiment is basically the same as that of the first embodiment, and therefore, like parts are represented with like reference marks.

The head suspension 1E employs a load beam 5E made of a linear material, for example, a stainless steel wire instead of the plate load beam 5 of the first embodiment. Ends 25E of the load beam 5E are fixed to a front end 27 of an arm body 14 of an arm 3E by, for example, laser welding or by bonding.

On an extension 15 of the arm 3E, the load beam 5E consists of a resilient part 17E close to each end 25E and a rigid part 11E in a front area of the load beam 5E. A front end of the load beam 5E is provided with a bent protrusion 35E corresponding to the dimple 35 of the first embodiment. The bent protrusion 35E is in contact with a tongue 37.

The sixth embodiment provides substantially the same effects as the first embodiment.

In addition, according to the sixth embodiment, the load beam 5E is made of a stainless steel wire to reduce the total weight of the head suspension 1E even with the extension 15 provided for the arm 3E.

Seventh Embodiment

Figure 20:
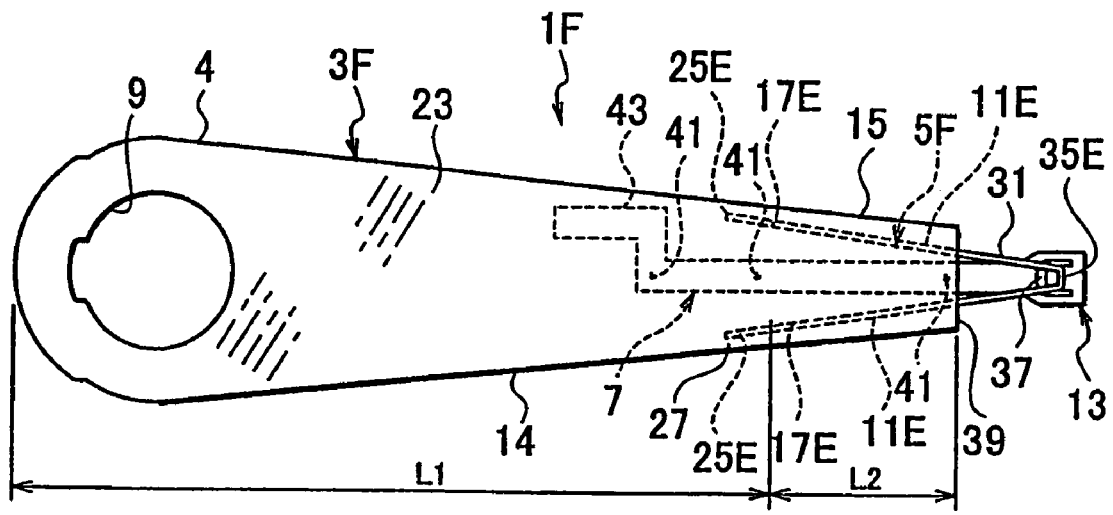
FIG. 20 is a plan view showing a head suspension for a disk drive according to a seventh embodiment of the present invention.
Figure 21:
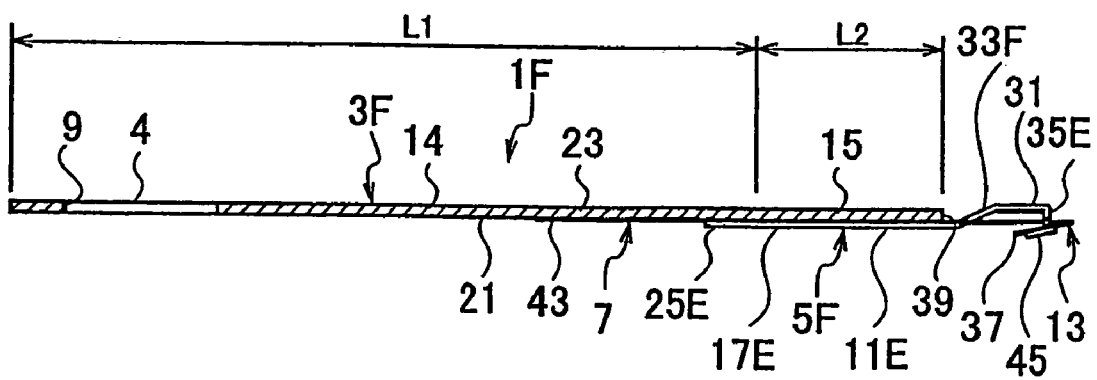
FIG. 21 is a sectional view showing the head suspension of FIG. 20.
Figure 22:
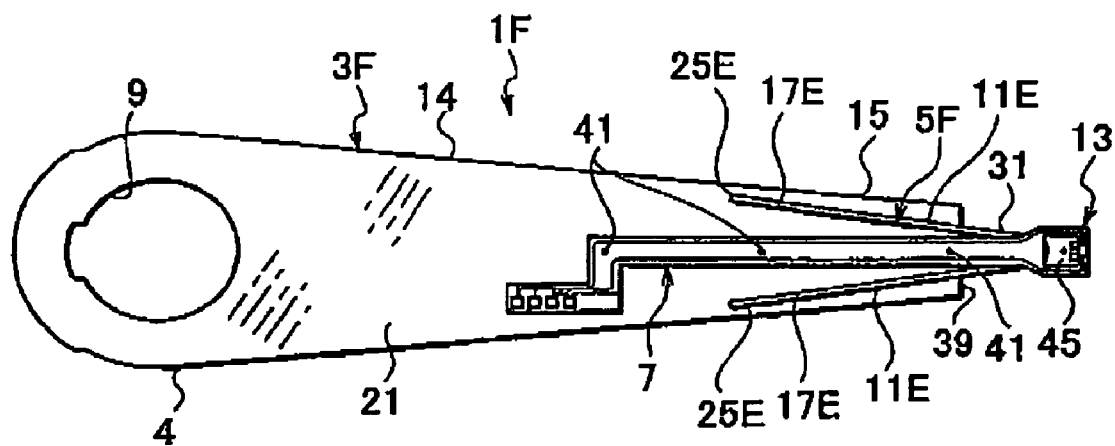
FIG. 22 is a bottom view showing the head suspension of FIG. 20.
Figure 23:
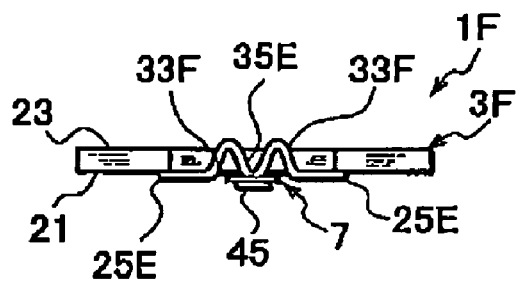
FIG. 23 is a front view showing a head area of the head suspension of FIG. 20.
Figure 24:
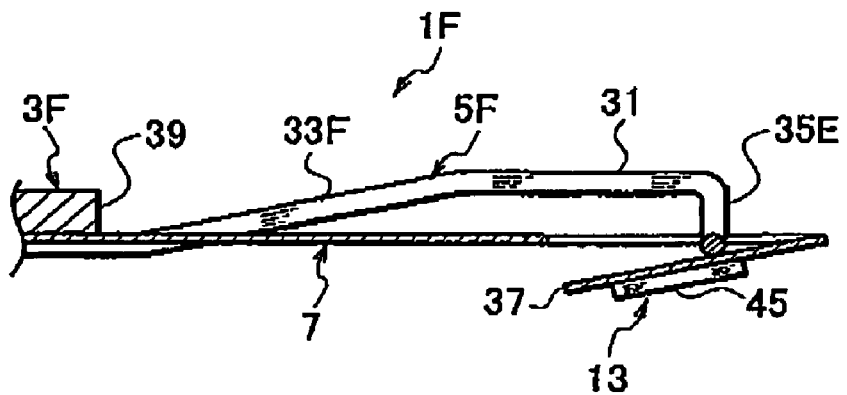
FIG. 24 is an enlarged sectional view showing the head area of the head suspension of FIG. 20.

FIGS. 20 to 24 show a head suspension 1F for a disk drive according to the seventh embodiment of the present invention, in which FIG. 20 is a plan view showing the head suspension 1F, FIG. 21 is a sectional view showing the same, FIG. 22 is a bottom view showing the same, FIG. 23 is a front view showing a head part of the same, and FIG. 24 is an enlarged sectional view showing the head part. The head suspension 1F of the seventh embodiment is basically the same as that of the sixth embodiment, and therefore, like parts are represented with like reference marks.

The head suspension 1F employs a load beam 5F made of a linear material such as a stainless steel wire, like the sixth embodiment. The seventh embodiment, however, supports the load beam 5F on a first face 21 of an arm 3F where a flexure 7 is supported. A front end 31 of the load beam 5F is provided with a bend 33F for biasing the front end 31 toward a second face 23 of the arm 3F.

The seventh embodiment provides substantially the same effects as the sixth embodiment.

In addition, according to the seventh embodiment, the load beam 5F and flexure 7 are both supported on the first face 21 of the arm 3F. It is possible, therefore, to arrange the load beam 5F and flexure 7 on each face of the arm 3F. In this case, the head suspension 1F is applicable to a plurality of disks arranged one above another in a disk drive.

Each of the embodiments mentioned above employs a single plate arm (3, 3A, 3B, 3C, 3D, 3E, 3F) serving as a carriage arm. The present invention is also applicable to the structure of FIG. 27 that employs a base plate joined with a carriage arm connected to a positioning motor such as a voice coil motor. This sort of application of the present invention will be explained.

Eighth Embodiment

Figure 25:
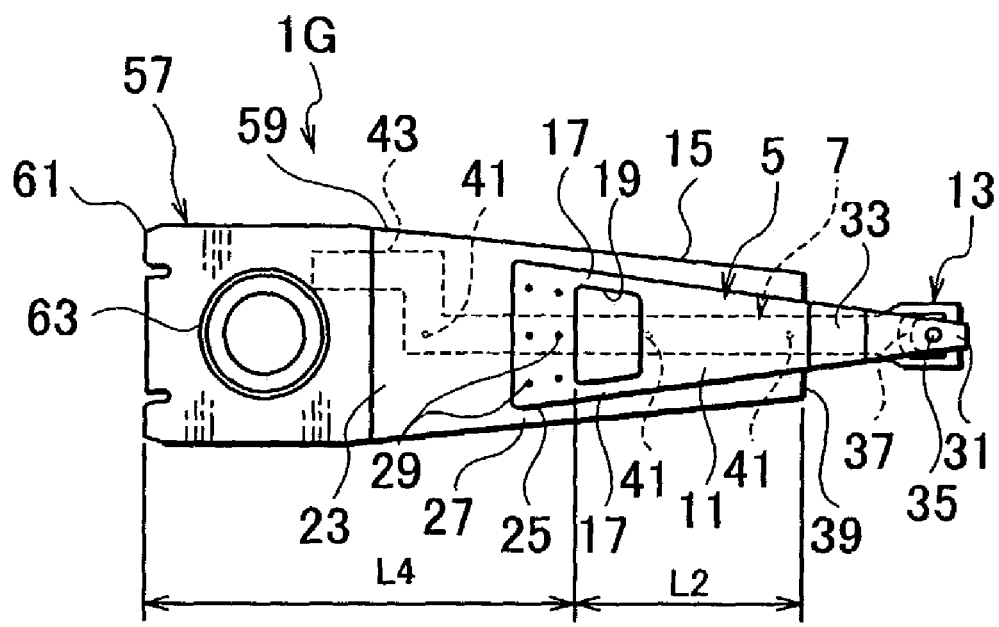
FIG. 25 is a plan view showing a head suspension for a disk drive according to an eighth embodiment of the present invention.
Figure 26:
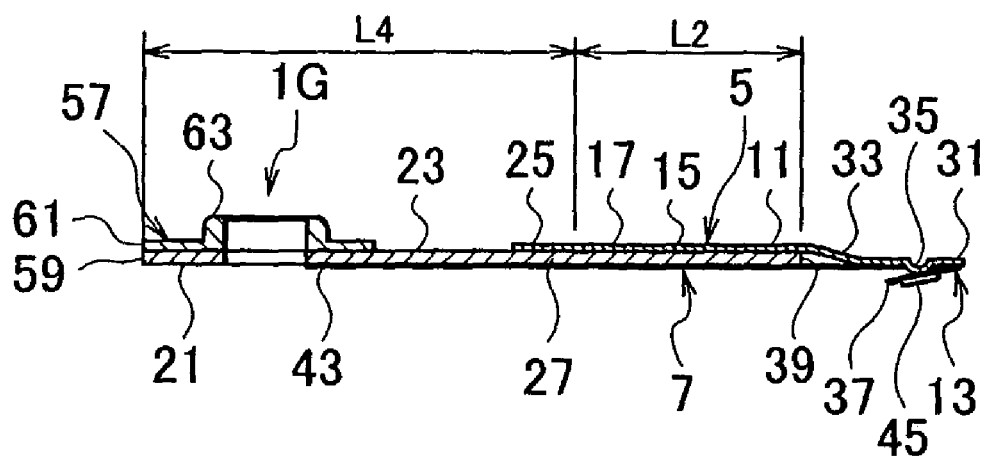
FIG. 26 is a sectional view showing the head suspension of FIG. 25.

FIGS. 25 and 26 show a head suspension 1G for a disk drive according to the eighth embodiment of the present invention, in which FIG. 25 is a plan view showing the head suspension 1G and FIG. 26 is a cross sectional view showing the same. The head suspension 1G of the eighth embodiment is basically the same as that of the first embodiment, and therefore, like parts are represented with like reference marks.

The head suspension 1G has a base plate 57. The base plate 57 consists of a body 59 having a length of L4 and an extension 15 having a length of L2. A base end 61 of the body 59 is provided with a boss plate 63. A load beam 5 is fixed to the body 59 by, for example, laser welding 29. A flexure 7 is supported by the extension 15 and body 59. The flexure 7 may be supported only by the extension 15.

To attach the head suspension 1G to a carriage arm, the boss plate 63 is plastically deformed and expanded in a radial direction.

The base plate 57 attached to the carriage arm is driven by and rotated around a spindle of a carriage of the disk drive. At the same time, the load beam 5 applies load on a slider 45 arranged at a front end of the head suspension 1G, like the first embodiment.

The eighth embodiment provides substantially the same effects as the first embodiment.

The structure of the eighth embodiment can also be employed to any one of the second to seventh embodiments.

Any one of the arms 3, 3A, 3B, 3C, 3D, 3E, and 3F may have proper openings on the arm body 14, extension 15, and the like, to reduce the total weight of the head suspension. The base plate 57 may also have openings to reduce the weight of the head suspension 1G.

The flexure 7 may be supported only by the extension 15.

What is claimed is:

1. A head suspension for a disk drive, comprising:
   an arm to be attached to a carriage of the disk drive and turned around a spindle;
   a load beam having a rigid part, a resilient part, and a base end being fixed to a portion of the arm and supported by the arm, a front end of the rigid part applying load on a head that writes and reads information to and from a disk;
   a flexure supporting the head, the flexure being directly connected to the arm; and
   an extension extending from the portion of the arm to which the base end of the load beam is fixed, the extension extending through the resilient part along the rigid part of the load beam toward the head,
   the flexure being directly connected to the extension of the arm.

2. A disk drive head suspension, comprising:
   an arm to be attached to a carriage of a disk drive and turned around a spindle;
   a load beam having a rigid part and a resilient part and supported by the arm, a front end of the rigid part applying load on a head that writes and reads information to and from a disk;
   a flexure supporting the head, the flexure being directly connected to the arm;
   an extension extending from the arm along the rigid part of the load beam toward the head,
   the flexure being directly connected to the extension of the arm;
   the arm has a first face that faces the disk and a second face that does not face the disk;
   the first face supports the flexure; and
   the second face supports the load beam.

3. The disk drive head suspension of claim 1, wherein:
   the load beam and flexure are supported on a first face of the arm that faces the disk.

4. The disk drive head suspension of claim 1, further comprising:
   a load beam limiter arranged between the arm and the load beam, to restrict displacement of the load beam.

5. The disk drive head suspension of claim 2, further comprising:
  a load beam limiter arranged between the arm and the load beam, to restrict displacement of the load beam.

6. The disk drive head suspension of claim 3, further comprising:
  a load beam limiter arranged between the arm and the load beam, to restrict displacement of the load beam.

7. The disk drive head suspension of claim 4, wherein the load beam limiter comprises:
  a limiter arm extending from the extension of the arm toward the head; and
  an attachment arranged on at least one of the limiter arm and load beam, to allow the limiter arm and load beam to engage with each other.

8. The disk drive head suspension of claim 5, wherein the load beam limiter comprises:
  a limiter arm extending from the extension of the arm toward the head; and
  an attachment arranged on at least one of the limiter arm and load beam, to allow the limiter arm and load beam to engage with each other.

9. The disk drive head suspension of claim 6, wherein the load beam limiter comprises:
  a limiter arm extending from the extension of the arm toward the head; and
  an attachment arranged on at least one of the limiter arm and load beam, to allow the limiter arm and load beam to engage with each other.

10. The disk drive head suspension of claim 1, further comprising:
  a flexure limiter arranged between the arm and the flexure, to restrict displacement of the flexure.

11. The disk drive head suspension of claim 2, further comprising:
  a flexure limiter arranged between the arm and the flexure, to restrict displacement of the flexure.

12. The disk drive head suspension of claim 10, wherein the flexure limiter comprises:
  a limiter arm extending from the extension of the arm toward the head; and
  an attachment arranged on at least one of the limiter arm and flexure, to allow the limiter arm and flexure to engage with each other.

13. The disk drive head suspension of claim 11, wherein the flexure limiter comprises:
  a limiter arm extending from the extension of the arm toward the head; and
  an attachment arranged on at least one of the limiter arm and flexure, to allow the limiter arm and flexure to engage with each other.

* * * * *